Patented Nov. 21, 1944

2,362,993

UNITED STATES PATENT OFFICE 2,362,993

PROCESS FOR THE SEPARATION OF THE HORMONE AND HORMONELIKE COMPONENTS OF THE PITUITARY GLAND

Gerhard A. Fleischer and Erwin Schwenk, Montclair, N. J., assignors to Schering Corporation, Bloomfield, N. J., a corporation of New Jersey No Drawing. Application November 6, 1940, Serial No. 364,542

11 Claims. (Cl. 167—74)

The present invention relates to the extraction and separation of the different groups of hormones and hormone-like substances of the pituitary gland.

This application is a continuation in part of our application Serial No. 299,978, filed October 18, 1939, now Patent No. 2,327,375, issued August 24, 1943.

It is the general object of the invention to provide an efficient and economical process which is applicable to the whole pituitary gland, that is, to both the anterior and posterior lobes, for separating the hormone substances from the inert material and from each other; and more particularly to provide a process whereby the thyreotropic and gonadotropic hormones are isolated from the glandular material and from each other in such a manner that the residual material can be effectively worked up for the recovery of other hormones and physiologically active materials, including the lactogenic (prolactin) and corticotropic hormones and the hypnotic, oxytocic and vasopressor factors.

It is a further object of the invention to provide an improved process for the isolation and separation of the hormones and hormone-like substances and other physiologically active components of either the anterior lobes or the posterior lobes of the pituitary, or from extracts prepared from either of the lobes. Other objects of the invention will appear from the following detailed description.

It is known that the two lobes of the pituitary gland, the anterior lobe and the posterior lobe, contain a number of substances of hormone or otherwise physiologically active character which heretofore have been isolated by processes resulting in the preparation of each of them separately. The methods used will often destroy or impair some of the other active substances present in the pituitary and so make it impossible to recover most of the active substances from the same batch of material. This is a fact of great importance, because the pituitaries, owing to the small size of the gland, are extremely expensive in comparison with other glandular starting materials. A method which will allow the preparation of several of the active substances from the batch of pituitaries must therefore be considered of great commercial importance.

We have found that by using a modification of the procedure described in our copending application Serial No. 299,978, the isolation of the different active principles of the pituitary from the same batch of starting material can be efficiently accomplished. We have found that by adjusting the pH, salt concentrations and the concentrations and relative amounts of the precipitating agents and reacting materials, it is possible to separate the different active principles. As starting material, whole pituitary glands may be used, but the process may also be used for the working up of the separated anterior and posterior lobes of the pituitary glands. Furthermore, dry preparations may be used which are obtained when the finely ground pituitary glands, or the separated lobes, are dried in vacuum, or when such ground material is treated with high concentrations of acetone and dried afterwards. Other starting materials include alkaline extracts precipitated with acetone or alcohol, as described, for instance, by Riddle and Bates (Bates, Robert W., and Riddle, Oscar: J. Pharmacol. and Exp. Therap. 55, 365 (1935)) and containing all of the hormone principles. All these starting materials will behave similarly when subjected to our new process.

We have found further that it is possible to divide the active substances present in the pituitary into three groups. The first group consists of such active substances as by virtue of their high molecular weight and composition are very closely related to the proteins, as, for instance, the lactogenic hormone of the pituitary. The adreno-corticotropic hormone of the anterior lobe behaves similarly. A second group comprises substances which, like the gonadotropic hormones, the synergist of Evans and coworkers and the thyreotropic hormone, have apparently smaller molecular weights and in their composition probably resemble or even are identical with the so-called glyco-proteins (mucoids). A third group comprises substances of the type of the oxytocic and vasopressoric principles of the posterior lobe. These are probably amines of not very high molecular weights. In this part of the extracts also a peculiar new substance is contained which acts as a hypnotic.

Our researches have established that the first group of physiologically active substances can be separated from the other groups by adjusting the pH value, preferably to between 5 and 6 (although higher values can be used), and treating, for example, the finely ground whole glands, or the extracts from the whole gland mentioned above, in aqueous suspension or solution with an inert water-immiscible organic liquid like chloroform and other liquids mentioned in the above-named copending application and preferably in the presence of a salt. By shaking or stirring this mixture where a sufficient volume of the water-immiscible liquid has been employed, three layers are formed after the agitation of the mixture, one being the aqueous layer containing the thyreotropic and gonadotropic hormones and the synergist, together with the hypnotic, oxytocic, and vasopressor components; the water-immiscible liquid constituting the second layer and the gel precipitate the third, the latter containing the protein and protein-like material, including the lactogenic and corticotropic hormones. By separating the gel which has formed, the active substances of high molecular weight, for instance, the lactogenic hormone and adrenocorticotropic hormone, are removed together with the inert proteins. The water solution which is separated from the gel by centrifugation or otherwise, contains all the other active principles, including the thyreotropic and gonadotropic factors. By treatment of the water solution with organic solvents miscible with water, such as methyl, ethyl, propyl, tertiary butyl, and other water-miscible alcohols, acetone, ethylene glycol and the like, the concentration of this solvent being at least about 60%, a precipitate is obtained which contains the gonadotropic hormones, that is, the follicle stimulating and the luteinizing factors and the synergist as well as the thyreotropic hormone. The concentration of the organic solvent depends to a certain degree upon the pH of the solution; with increasing pH value an increase in the amount of alcohol or similar solvent becomes necessary. The optimum concentrations for any given conditions can be readily determined by simple experiment. From the precipitate obtained in this way, the crude hormones may be separated, for example, in the manner described below. The now remaining solution contains the third group of active substances mentioned above, namely, the oxytocic, vasopressoric, and hypnotic principles of the posterior pituitary lobe.

A further purification of the prolactin contained in the first-mentioned gel may be obtained by known methods. The only important impurities in this gel are proteins of much higher molecular weight than the prolactin itself. For instance, by extracting the gel at a pH value of 8–10 with an aqueous solution of about 60–70% alcohol or about 60% acetone, the prolactin is quantitatively extracted, and after elimination of the inert proteins may be precipitated with a higher concentration of the solvent and a lower pH value. It is still contaminated with adrenocorticotropic hormone which may be separated from the prolactin by iso-electric precipitation.

The second group of hormones is separated and purified by treatment of the solution containing gonadotropic hormone and thyreotropic hormone with picric acid, or similar substances, like picrolonic acid, or other precipitating agents for the thyreotropic hormone. By treating the solution with picric acid at a saturation of not more than 75%, a precipitate is obtained which contains practically all of the thyreotropic hormone and is substantially free from the gonadotropic factor. From the supernatant liquid the gonadotropic hormones are precipitated after neutralization by the addition of alcohol or acetone to at least 60%. These hormones may be further purified by iso-electric precipitation or by the procedure described by Evans, using ammonium sulfate for the separation of the FSH and the ICSH factors (follicle-stimulating hormone and interstitial-cell-stimulating hormone).

The mother liquors obtained from the precipitation of the gonadotropic hormone contain the substances of the above-mentioned third group. They are freed from the alcohol or acetone and then concentrated at very low temperature to about 1/10 of their volume. This solution is then dialyzed. The oxytocic and vasopressoric principles dialyze together with the salts. After dialyzation the inner solution may be used as such or may also be evaporated to dryness in good vacuum at a temperature not exceeding 20°. This material contains the hypnotic factor. When injected into animals as, for instance, mice or rats, the animals become drowsy and the temperature, as measured in the rectum, drops considerably. After a certain time the animals recover and the temperature reaches the normal level again.

By the term "inert, water-immiscible organic liquid," as used herein, is meant a substantially neutral organic water-immiscible liquid which is non-reactive under the conditions of use and is capable of forming a phase surface of contact with water and of forming a gel with proteins, if necessary after vigorous agitation. The solubility of such liquid should preferably be not less than about 0.5% and not more than about 10% in water, although somewhat higher solubilities may be found to be satisfactory in certain instances so long as the organic liquid forms a distinctly separate layer with water, the proportion of organic liquid being chosen accordingly. As suitable liquids of this type in addition to chloroform are methylene chloride, cyclohexanone, amyl alcohol, dichloro-ethylene, ethylene chloride, and mixtures of these, for example, chloroform and amyl alcohol. The gel formation is preferably accomplished in an aqueous medium containing a small amount of a salt, which salt may be either added as such, or formed on the acidification of an aqueous alkaline extract of the glandular material. Where it is present, the amount of salt should be sufficient to create the particular electrical charge necessary to the formation of a gel, but it should not be of such nature or present in such quantities as to prevent the precipitation of the hormone and other substances which, as described below, are carried down in the gel precipitate; nor should the quantity of salt employed be such as to interfere with the subsequent separation of the three layers that are formed (aqueous layer, water-immiscible solvent, and gel).

The initial extraction of the glandular material is preferably carried out with a solution of an inorganic base, for example, of sodium or potassium hydroxide or carbonate, ammonium hydroxide, lithium hydroxide, barium hydroxide and the like. Organic bases may, however, also be employed, such as pyridine, trimethylamine, urea, and other bases. The initial extraction can also be effected under slightly acid conditions, as with water acidified with acetic, lactic, phosphoric, and other, preferably relatively weak, acids. The agitation with the water-immiscible liquid is performed with sufficient violence to form an emulsion, at least momentarily, with the aqueous extract, this result being aided by maintaining slightly acid conditions with the temperatures preferably maintained no higher than about 20°, lower temperatures being advantageous. The acidity can be maintained either by the use of an acid, as already indicated, or by the addition of a suitable acid salt.

The relative volumes of the aqueous extract of the glandular material and that of the water-immiscible liquid employed for the gel formation should, of course, be chosen with the relative solubilities in mind to the end that two definite and separable layers as between the water and organic liquid are maintained. When necessary, the volume of the aqueous extract may be reduced, as by partial evaporation at low temperatures in vacuo. In any event, the amount of salt material present, as already indicated, should not be so high as to interfere with the separation of the water and the organic liquid into distinct layers.

The salts employed during the gel formation and subsequently to effect separation of various components include the acetates, sulphates, and chlorides of sodium, potassium, lithium, magnesium, and ammonium, calcium chloride, and other water-soluble salts which in general do not form chemical combinations with the hormones or other physiological components of the mixture.

The invention is described in greater detail in the following examples which are presented by way of illustration only.

Example 1

4.46 kg. of frozen undissected sheep pituitaries are ground twice and then stirred for 10 hours with 13.38 liters of water +42.8 cc. of 20% NaOH. The pH of the extraction is then adjusted to 5.5 with acetic acid. 8.92 liters of chloroform are added and this mixture is shaken or stirred vigorously for one hour and then centrifuged. The clear aqueous top layer is decanted and called A-1. The remainder consists of a gel and a liquid layer, the latter consisting of chloroform which after distillation, whereby a fatty residue is obtained, may be used again in the process. The gel, which we shall call A, is then stirred into acetone and collected on a filter. When dry, it is extracted for 4 hours with a mixture of 8.5 liters of alcohol and 4.28 liters of water at pH 9.5, the pH being adjusted with 20% NaOH. This is centrifuged and the residue re-extracted for the second time with a mixture of 8.5 liters of alcohol and 4.28 liters of water, this time at pH 10.0. The insoluble material which consists of inert proteins is then discarded.

The two extractions are combined, adjusted to approximately pH 6 by means of acetic acid and precipitated with 2 vols. of acetone. This precipitate is allowed to settle in the ice box over night. The next day it is worked up by syphoning off the supernatant liquor and filtering the residue. The product thus obtained consists of prolactin besides the corticotropic hormone and some other material. It is stirred for one hour with 30 parts by weight of acetone and 1.5 parts by weight of normal hydrochloric acid in order to extract the methaemoglobin. The material is collected on a filter and washed thoroughly with acetone. It is then extracted once with 15 parts and twice with 7½ parts of a 1% sodium chloride solution. The remaining residue is inactive. The combined solutions are brought to pH 7.5 and centrifuged. The pH 7.5 insoluble material is inactive with respect to lactogenic (prolactin) properties, the supernatant liquid containing all the lactogenic and adrenocorticotropic activity. The corticotropic hormone is obtained as a precipitate by adjusting the pH of the solution to 6.5 and the salt concentration to 4%. The supernatant liquor is then adjusted to pH 5.5 and 15% sodium chlorine content. The precipitate so formed is separated from the solution, washed first with 15% sodium chloride solution, then with a little ice-cold water, and finally dried with acetone. It is a white powder, assaying 12 Riddle units of prolactin per milligram. It does not have any toxic or anaphylactic properties.

The solution A-1 is precipitated with 5½ vols. of alcohol or acetone. The precipitate, called B, is worked up the next day and yields around 80 grams of a preparation containing all gonadotropic factors, the thyreotropic hormone, and the synergist. The supernatant liquid B-1 is evaporated in vacuum at an inside temperature of 20° C. or less, to about 1.5 liters. It is then dialyzed to remove all salts and the oxytocic and vasopressoric principles and is concentrated further in vacuo to about 200 cc. This solution constitutes a very potent extract of the hypnotic factor.

Precipitate B is dissolved in 20 parts of water. It is then acidified to pH 3.0 with dilute hydrochloric acid and picric acid is added to a concentration of 0.6%, which is 50% of saturation. The precipitate is allowed to settle in the ice-box over night. The next day the supernatant liquid is separated by syphoning and centrifuging. It is designated C-1 and contains the gonadotropic principles and the synergist, whereas the precipitate C contains the thyreotropic hormone. The latter is separated from the picric acid by taking it up in diluted ammonia so that the pH is about 7.5. It is precipitated with 5 parts of acetone, the precipitate collected on a filter and washed with acetone until free from picric acid. The yield is about 30 grams of thyreotropic hormone which can be further purified by precipitation from aqueous solution with zinc acetate.

The solution C-1 is precipitated with 5 times its volume of alcohol and a small amount of sodium acetate, yielding about 40 grams of gonadotropic hormone and synergist, called D, whereas the mother liquor D-1 contains only some inert material. The separation of the thyreotropic from the gonadotropic hormones in the aqueous solution of precipitate B may in general be conducted along the lines described in the application of Hans Maier-Huser and Karl Junkmann, Serial No. 250,160, now Patent No. 2,331,334, issued October 12, 1943.

The separation of thyreotropic and gonadotropic hormones can also be carried out directly with solution A-1, that is, without preliminary separation of the hypnotic, oxytocic, and vasopressor factors. In this case the mother liquors of the gonadotropic hormone contain not only the hypnotic, oxytocic, and vasopressor principles but also picric acid. The latter, however, crystallizes out and such solutions are concentrated in vacuo and the last traces of picric acid can be removed by shaking out the concentrate with amyl alcohol.

Example 2

100 grams of acetone dried anterior pituitary glands are extracted with 1.5 liters of water at pH 8. The mixture is stirred for 4 hours and filtered, after which time the pH value of the filtrate is adjusted to 5.8 by the addition of hydrochloric acid. 2% by weight of NaCl are then added and the mixture is shaken vigorously for 1 hour with 750 cc. of methylene chloride. It is then centrifuged. The water layer is saturated with, for example, picric acid in order to precipitate both the gonadotropic and thyreotropic hormones. They may be separated according to Example 1. The methylene chloride gel is freed of as much methylene chloride as possible and is then dried by treating it with acetone. The temperature should, preferably, at no time exceed 20° C. It is further purified according to Example 1.

*Example 3*

500 grams of frozen posterior pituitary glands are macerated and are extracted with 1.5 liters of water at pH 7.5. After stirring has been continued for 4 hours, the mixture is filtered and the pH value of the filtrate is adjusted to 4.0 by the addition of acetic acid, and 1.5 liters of chloroform plus 50 cc. of amyl alcohol are then added. This mixture is stirred or shaken vigorously for 1 hour and then centrifuged. The clear supernatant water layer is decanted, whereas the chloroform gel is dried as described above. The volume of the water extract is then reduced to about 100 cc. and this is put in a dialyzer and is dialyzed for 48 hours. After dialyzing has been completed, a separation of the posterior hormones has taken place, the inner solution containing the hypnotic factor whereas the outside solution contains the oxytocic and vasopressoric hormones. The latter can be worked up according to known methods. The solution containing the hypnotic factor is again concentrated in vacuo, and centrifuged, and may be used as such or further purified.

As will be evident to those skilled in this art, variations from the specific procedures, concentrations, and pH values may be resorted to, if necessary, with compensating change in other conditions, without departing from the principles of the invention. Thus the treatment with the water-immiscible liquid may be conducted at a pH value lower than 5.5, or it may take place in the alkaline range, say at a pH value of about 8.0. The salt employed during this treatment may be of various types and its concentration will be adjusted in known manner for any particular extract to produce the desired separation with the highest efficiency.

We claim:

1. Process for the separation of the lactogenic and corticotropic hormones from pituitary gland material, which comprises treating such material in an aqueous acid medium with a water-immiscible liquid capable of forming a gel with the protein-like substances of high molecular weight, extracting the gel with a mixture of water and a water-miscible organic liquid under alkaline conditions, increasing the concentration of organic solvent and reducing the pH to a value below 7 to cause precipitation of the lactogenic and corticotropic hormones, and subsequently separating such hormones.

2. Process according to claim 1, wherein the lactogenic and corticotropic precipitate is treated with a dilute salt solution to effect solution of the lactogenic and corticotropic hormones, and the pH value of the extract then raised to about 7.5 to effect precipitation of impurities.

3. Process according to claim 1, wherein the lactogenic and corticotropic precipitate is extracted with an aqueous medium to bring the lactogenic and corticotropic hormones into solution and then adding salt to the solution and adjusting the pH value to approximately 6.5 to effect the precipitation of the corticotropic hormone.

4. Process according to claim 1, wherein the lactogenic and corticotropic precipitate is treated with a dilute salt solution to bring the lactogenic and corticotropic hormones into solution, then adjusting the salt concentration of the solution to a higher value at a pH value of approximately 6.5 to effect the precipitation of the corticotropic hormone, and reducing the pH value of the separated residual solution and increasing the salt concentration to effect precipitation of the lactogenic hormone.

5. Process for the separation of the lactogenic and corticotropic hormones which comprises treating an aqueous solution of the two hormones at low acidity with a salt solution sufficiently concentrated to effect precipitation only of the corticotropic hormone, and thereafter increasing the acidity and likewise the concentration of salt to cause precipitation of the lactogenic hormone.

6. Process for the isolation and separation of the lactogenic and corticotropic hormones from pituitary extracts, which comprises treating a suspension of pituitary gland material under acid conditions with chloroform and agitating the mixture until a gel is produced, separating the gel, extracting the same with a mixture of water and alcohol at an alkaline pH, treating the extract at a pH value of about 6 with acetone to increase the concentration of organic liquid sufficiently to cause precipitation of the lactogenic and corticotropic hormones, purifying the precipitate by extraction with acetone and dilute mineral acid, extracting the solid residue with an approximately 1% NaCl solution, raising the pH value of the solution to about 7.5, separating the precipitate, reducing the pH value of the solution to about 6.5 and increasing the salt concentration to about 4%, separating the precipitate of the corticotropic hormone, reducing the pH value of the liquor to about 5.5 and increasing the salt concentration to about 15%, and separating the resulting precipitate of the lactogenic hormone.

7. In a process for the recovery of physiologically active components of the anterior lobe of the pituitary gland, the steps which comprise adding a salt to an aqueous extract of such lobe, agitating the mixture under acid conditions with an inert water-immiscible organic liquid capable of forming a gel with protein and protein-like substances until a gel is formed, and separating the aqueous solution from the gel.

8. In a process for the recovery of physiologically active components of the posterior lobe of the pituitary gland, the steps which comprise agitating an aqueous extract of such lobe at a pH value of about 5.5 with an inert water-immiscible organic liquid capable of forming a gel with protein and protein-like substances until a gel is formed, separating the aqueous solution from the gel, extracting the gel with a mixture of water and a water-miscible organic solvent under alkaline conditions, and successively precipitating the corticotropic and the lactogenic hormone by progressively increasing the hydrogen ion concentration and the concentration of an added salt.

9. In a process for the separation of the physiologically active components of the pituitary gland, the steps which comprise agitating an aqueous acidified suspension of pituitary gland material with an inert water-immiscible organic liquid capable of forming a gel with part of the components of said material until a gel is formed, separating the aqueous layer from the gel, extracting the gel, under alkaline conditions, with an aqueous medium, and precipitating the lactogenic and corticotropic hormones from the said aqueous medium by treating the latter, under increased hydrogen ion concentration, with a water-miscible organic liquid.

10. In a process for the separation of the lactogenic hormone from pituitary gland material containing inert protein matter, the steps which comprise agitating an aqueous suspension of the pituitary gland material under acid conditions with an inert, water-immiscible organic liquid capable of forming a gel with proteins and protein-like substances until a gel is formed, removing the gel containing the lactogenic hormone, and separating the hormone from the gel.

11. Process according to claim 10, wherein the pituitary gland material is agitated with chloroform at a pH value of about 5 to 6.

GERHARD A. FLEISCHER.
ERWIN SCHWENK.